United States Patent
Suzuki et al.

[19]

[11] Patent Number: 6,081,309
[45] Date of Patent: Jun. 27, 2000

[54] LIQUID CRYSTAL DEVICE

[75] Inventors: Masaaki Suzuki, Yokohama; Masanori Takahashi, Chigasaki, both of Japan

[73] Assignee: Canon Kabushiki Kaisha, Tokyo, Japan

[21] Appl. No.: 09/140,408

[22] Filed: Aug. 26, 1998

[30] Foreign Application Priority Data

Aug. 28, 1997 [JP] Japan .................................... 9-233042

[51] Int. Cl.⁷ ................................................. G02F 1/1335
[52] U.S. Cl. ......................... 349/106; 349/108; 349/109
[58] Field of Search .................................... 349/106, 108, 349/109, 85, 143; 345/88; 359/891

[56] References Cited

U.S. PATENT DOCUMENTS

| | | | |
|---|---|---|---|
| 5,270,848 | 12/1993 | Takabayashi et al. | 359/88 |
| 5,642,176 | 6/1997 | Abukawa et al. | 349/106 |
| 5,777,707 | 7/1998 | Masaki et al. | 349/106 |
| 5,808,594 | 9/1998 | Tsuboyama et al. | 345/89 |

*Primary Examiner*—James A. Dudek
*Assistant Examiner*—Tai V. Duong
*Attorney, Agent, or Firm*—Fitzpatrick, Cella, Harper & Scinto

[57] ABSTRACT

A liquid crystal device is constituted by a first substrate provided with a plurality of scanning electrodes; a second substrate provided with a plurality of data electrodes and disposed opposite to the first substrate, the data electrodes intersecting the scanning electrodes to form a plurality of pixels; a liquid crystal disposed between the first and second substrates; and a plurality of color filters of first to third colors composed of red, green and blue disposed on one of the first and second substrates. In the device each pixel is constituted by four intersections formed by adjacent two scanning electrodes and adjacent two data electrodes, said four intersections being provided with said color filters of first to third colors. The four intersections may preferably be arranged to provide broader two openings provided with color filters of green and red and narrower two openings each provided with a color filter of blue while keeping an areal ratio of each broader opening: each narrower opening =2:1, thus preventing a disturbance of color balance while retaining a high resolution and excellent color image qualities.

4 Claims, 6 Drawing Sheets

LIQUID CRYSTAL DEVICE

FIELD OF THE INVENTION AND RELATED ART

The present invention relates to a liquid crystal device for displaying data (information) by using a liquid crystal, particularly a liquid crystal device for effecting color (image) display.

There have been heretofore proposed various liquid crystal devices (or liquid crystal panels) for effecting color display.

Figure 1:
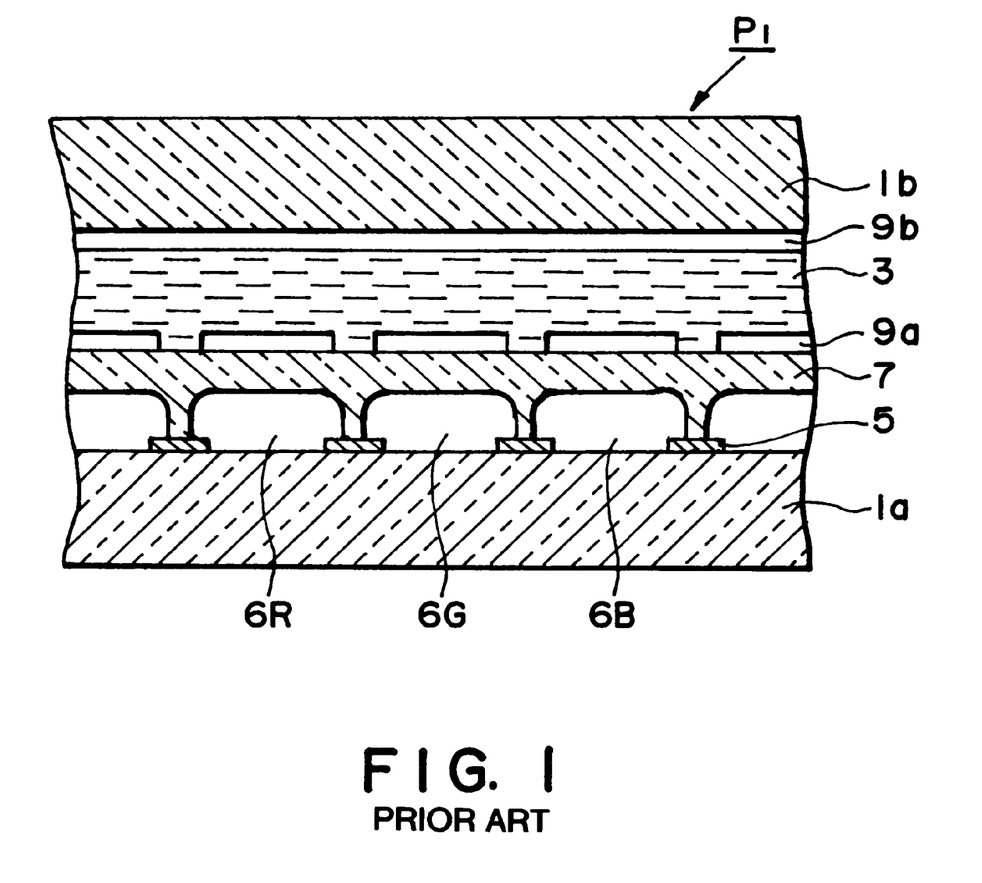
FIG. 1 is a schematic sectional view of an embodiment of a conventional liquid crystal device of a simple matrix-type.

FIG. 1 is a schematic sectional view of an embodiment of a conventional liquid crystal device (liquid crystal panel P1) of a simple matrix-type having a cell structure such that a liquid crystal 3 is sandwiched between a pair of oppositely disposed substrates 1a and 1b applied to each other via a sealing agent (not shown) at a periphery of the panel P1.

On substrate 1b is provided with a plurality of stripe-shaped scanning electrodes 9b at its surface, which are further coated successively with an insulating film (not shown) and an alignment control film (not shown).

On the other substrate 1a, color filters 6 of three colors consisting of red (R), green (G) and blue (B) (hereinafter, referred to as "red filter 6R", "green filter 6G" and "blue filter 6B", respectively and also simply referred to as "color filter 6" when the color of the color filters is not particularly restricted) are disposed with spacings therebetween, where a masking film 5 is disposed so as to prevent light-transmission at the spacings. These color filters 6 and masking pattern 5 are coated with a flattening layer 7 on which a plurality of stripe-shaped data electrodes 9a are disposed. The data electrodes 9a is successively coated with an insulating film (not shown) and an alignment control film (not shown).

Figure 2:
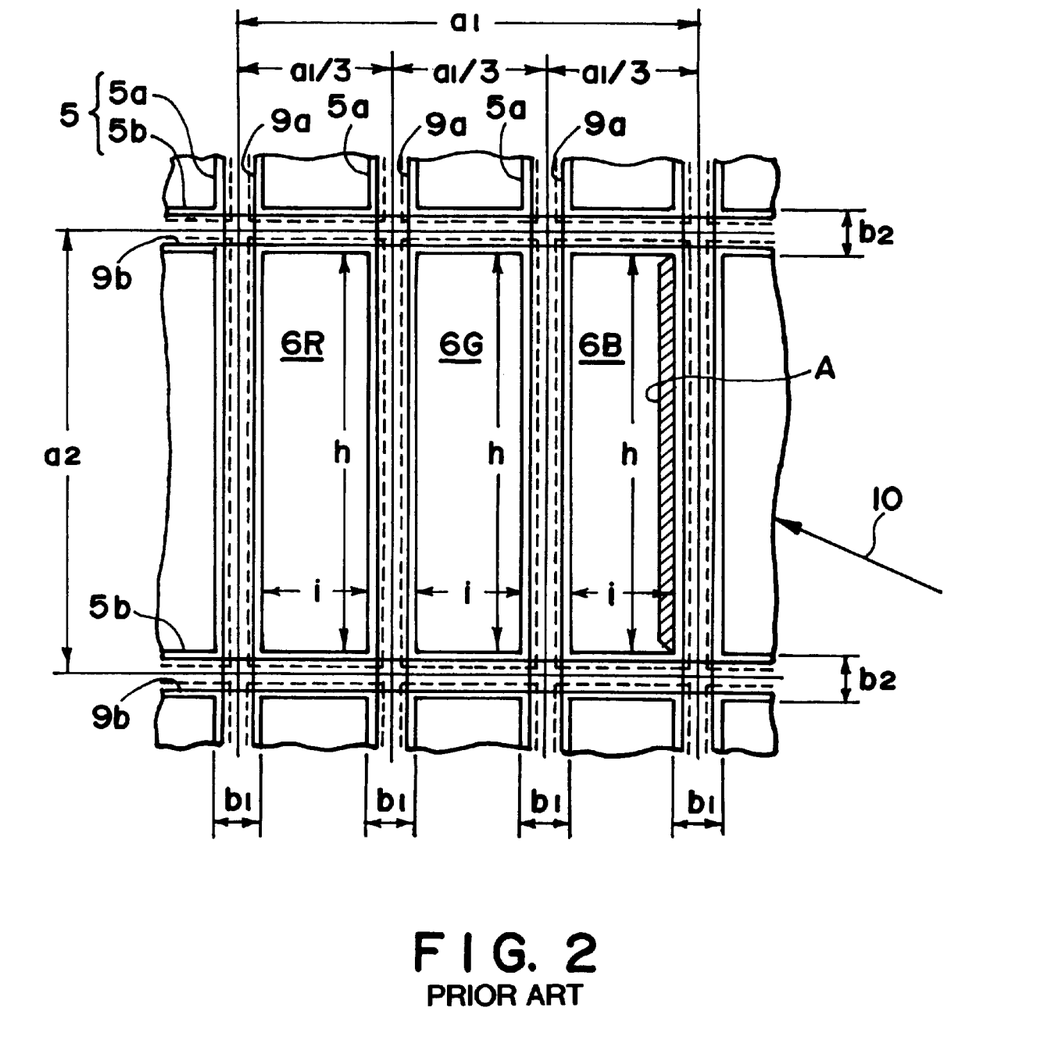
FIG. 2 is a schematic plan view of the conventional liquid crystal device shown in FIG. 1 for illustrating shapes and positional relationships for a masking pattern 5, data electrodes 9a, scanning electrodes 9b and color filters 6.

FIG. 2 is a schematic plan view of such a conventional liquid crystal panel P1 for illustrating shapes and positional relationships with respect to the masking pattern 5, the scanning electrodes 9b, the data electrodes 9a and the color filters 6 (6R, 6G and 6B).

Referring to FIG. 2, the masking pattern 5 is formed in a cross-stripe shape by stripe lines 5a and stripe lines 5b so as to leave a plurality of window-like (elongated rectangular) opening portions (hereinbelow, referred to as "bit opening (s)") where the three color filters 6 (red filter 6R, green filter 6G and blue filter 6B) overlap adjacent three bit openings, respectively. The three bit openings and spacings therebetween constitute one pixel having a size of a1×a2.

Each scanning electrodes 9b extends in a longitudinal direction (a right-and-left direction on the drawing (FIG. 2)) so as to cover the bit openings in their widthwise direction, and each data electrode 9a extends also in a longitudinal direction (a direction perpendicular to the right-and-left direction on the drawing), so as to cover the bit openings in their lengthwise direction, so that the data electrodes 9a intersect the scanning electrodes 9b each other at right angles to form an electrode matrix.

In the production process of the liquid crystal panel P1, the respective alignment control films (not shown) are generally subjected to uniaxial aligning treatment (e.g., rubbing treatment). When a rubbing treatment is performed in a direction of an arrow 10 (as shown in FIG. 2), however, the resultant liquid crystal panel P1 is liable to cause a switching failure, e.g., in a region A at the time of driving a panel P1 in some cases.

In recent years, the above-described liquid crystal panel is required to improve its display qualities by increasing a resolution or definition. When the resolution of the liquid crystal panel is increased up to at least 250 dpi (dots per inch), each bit opening has a width (shorter length) of ca. 12 μm or below as described hereinafter, which is too narrow for the bit opening, so that a proportion of the switching failure region A to the corresponding bit opening becomes large. As a result, the resultant display qualities of the liquid crystal panel in the entire display region is liable to become worse.

In the case where a liquid crystal panel has a resolution of 282 dpi, a width (width (i) shown in FIG. 2) of each bit opening is calculated as follows.

First, a pitch (a1) of one pixel in the lengthwise direction of the data electrodes 9a is obtained according to the following equation:

$$a1 = (25400 \, \mu m)/(282 \, dpi) = ca. 90 \, \mu m.$$

The stripe line 5a of the masking pattern 5 extending along the scanning electrodes 9b are apart from each other at a pitch (a1/3) (a distance between the center lines of adjacent two stripe lines 5a) of 30 μm (90 μm/3).

Now, letting a width (b1) of each stripe line 5a being 18 μm, the width (i) is 12 μm (=30 μm−18 μm).

On the other hand, the stripe lines 5b of the masking pattern 5 extending along the data electrodes 9a are apart from each other at a pitch (a2) (a distance between the center lines of adjacent two stripe lines 5b) of 90 μm which corresponds to a pitch of each pixel in the extension (lengthwise) direction of the scanning electrodes 9b (i.e., the widthwise direction of the data electrodes 9a). Assuming a width (b2) of each stripe line 5b to be 18 μm, a length (h) of each bit opening is 72 μm (=90 μm−18 μm).

In the above-described liquid crystal panel having the pixels each including three color filters 6 of the red filter 6R (left bit opening), the green filter 6B (center bit opening) and the blue filter 6B (right bit opening) arranged in this order in the lengthwise direction of the data electrodes 9a, when the left and right bit openings (the red and blue filters 6R and 6B) are turned "ON" (bright) states, a resultant resolution of the liquid crystal panel is liable to be somewhat lowered due to these bit openings relatively (48 μm in this case) apart from each other.

SUMMARY OF THE INVENTION

An object of the present invention is to provide a liquid crystal device suppressed in an adverse influence of a switching failure of a liquid crystal while keeping a higher resolution.

Another object of the present invention is to provide a liquid crystal device preventing an appearance of a somewhat lowered resolution.

A further object of the present invention is to provide a liquid crystal device preventing a disturbance of color balance.

According to the present invention, there is provided a liquid crystal device, comprising:

a first substrate provided with a plurality of scanning electrodes, a second substrate provided with a plurality of data electrodes and disposed opposite to the first substrate, the data electrodes intersecting the scanning electrodes to form a plurality of pixels, a liquid crystal disposed between the first and second substrates, and a plurality of color filters of first to third colors composed of red, green and blue disposed on one of the first and second substrates; wherein each pixel is constituted by four intersections formed by adjacent two scanning electrodes and adjacent two data electrodes, said four intersections being provided with said color filters of first to third colors.

In the above liquid crystal device, the four intersections may preferably include first to fourth intersections providing an areal ratio of 2:2:1:1 in this order. The first and second intersections each having the larger area may preferably be provided with two color filters of two colors selected from red (R), green (G) and blue (B) color filters, respectively, and the third and fourth intersections each having the smaller area may preferably be each provided with a color filter of remaining one color. The first to fourth intersections providing the areal ratio of 2:2:1:1 may more preferably be provided with color filters of red, green, blue and blue (in this order), respectively.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Hereinbelow, preferred embodiments of the liquid crystal device (liquid crystal panel) according to the present invention will be described with reference to FIGS. 3–6.

In FIGS. 3–6, respective structural members and respective dimensions identical to those of the liquid crystal device shown in FIGS. 1 and 2 are represented by identical reference numerals or symbols, respectively, unless expressly noted otherwise.

Figure 3:
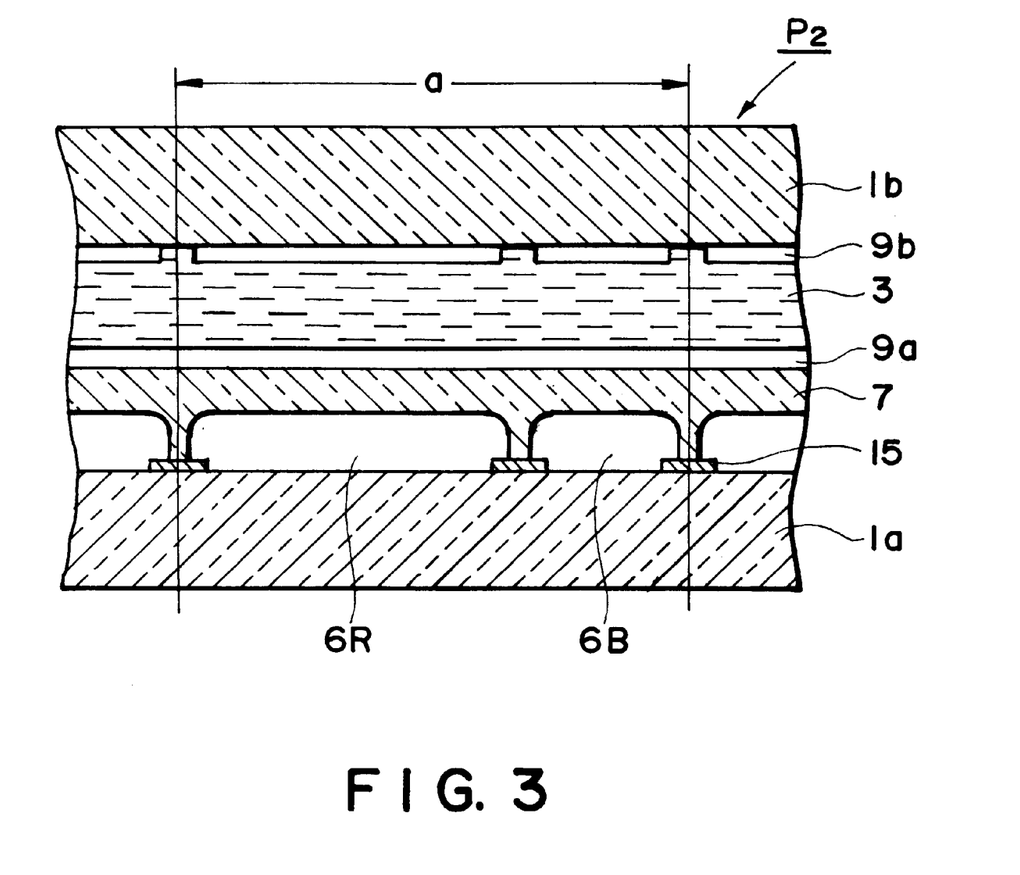
FIG. 3 is a schematic sectional view of an embodiment of a liquid crystal device according to the present invention.
Figure 4:
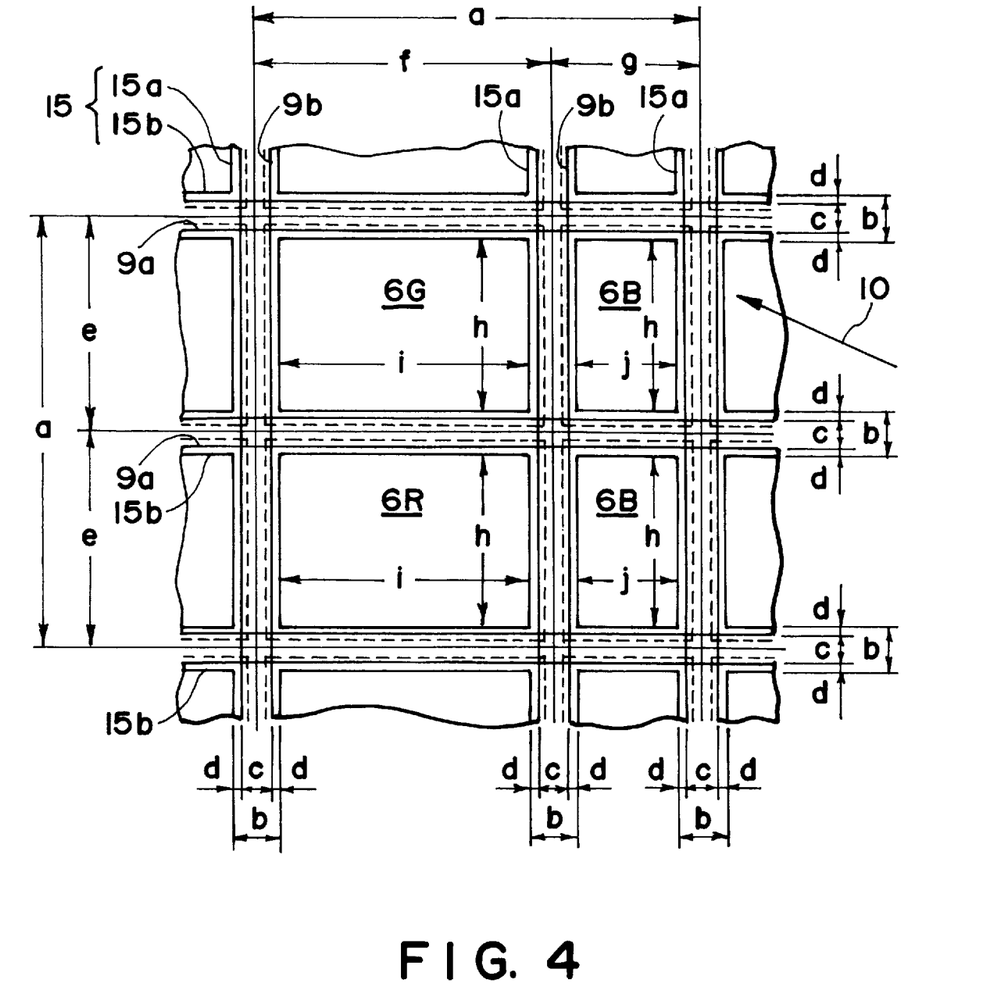
FIG. 4 is a schematic plan view of the liquid crystal device of the present invention shown in FIG. 3 for illustrating shapes and positional relationships for a masking pattern 15, data electrodes 9a, scanning electrodes 9b and color filters 6.

FIG. 3 shows an embodiment of a sectional structure of the liquid crystal device (a liquid crystal panel P2) of the present invention and FIG. 4 shows a corresponding planar structure thereof.

The liquid crystal panel P2 has a sectional structure similar to that of the liquid crystal panel P1 shown in FIG. 1 except that adjacent two (broader and narrower) scanning electrodes 9b and adjacent two data electrodes (of an identical width) intersect each other at right angles to provide four (first to fourth) intersections constituting one pixel and provided with color filters 6 of R, G and B (three first to third colors), thus effecting a multi color display.

The first and second intersections of the four intersections may preferably be provided with a color filter of a first color and a color filter of a second color, respectively, and the third and fourth intersections (of the four intersections) may preferably be provided with a color filter of a third color and a color filter of a third color, respectively.

In this embodiment, the first to third colors may desirably be R (red), G (green) and B (blue), respectively. Further, at the first to fourth intersections, corresponding first to fourth bit openings represented by 6G, 6R, 6B and 6B, respectively, may preferably be arranged to provide an areal ratio of 2:2:1:1) (6G:6R:6B:6B).

The substrates 1a and 1b and the data and scanning electrodes 9a and 9b may be composed of a transparent material to prepare a liquid crystal panel P2 of a light-transmission type. In this instance, the above-mentioned first to fourth bit openings (6G, 6R, 6B and 6B) correspond to four light-transmission regions providing an areal ratio of 2:2:1:1, respectively.

According to this embodiment, a set of four intersections formed by adjacent two data electrodes 9a and adjacent two scanning electrodes 9b (disposed perpendicular to the data electrodes 9a) constitutes one pixel, so that a minimum width of each bit opening at each intersection is made larger than that of each bit opening in the case of the conventional liquid crystal panel described above even when a resolution is increased up to at least 250 dpi. As a result, when the rubbing treatment is performed in the direction of the arrow 10 (shown in FIG. 4), the areal ratio of a switching failure region (e.g., A as shown in FIG. 2) to one color bit openings (6G and 6G shown in FIG. 4) becomes smaller, thus lowering an adverse influence of switching failure of a liquid crystal on resultant display (image) qualities.

Further, due to each pixel constituted by four intersections adjacent to each other, the (four) color filter 6 of three colors (the red filter 6R, the green filter 6G, the blue filter 6B and the blue filter 6B) at the corresponding four bit openings are also adjacent to each other, thus resulting in a display state with substantially no apparent lowering in resolution even when any color filter is turned "ON".

In this embodiment, the four bit openings provided with the green filter 6G, the red filter 6R, the blue filter 6B and the blue filter 6B are arranged to have the areal ratio of 2:2:1:1 (6G:6R:6B:6B) as described above, thus resulting in an identical area with respect to the respective color filters of three colors. As a result, it is possible to obviate a disturbance of color balance.

Further, in this embodiment, broader two bit openings having a width (i) are provided with the green filter 6G and the red filter 6R, respectively, and narrower two bit openings having a width (j) are each provided with the blue filter 6B and each include the switching failure region (A as shown in FIG. 2) in the case of effecting the rubbing treatment in the direction of the arrow 10. As a result, the areal ratio of the switching failure region to the narrower two bit openings (the two blue filter 6B) becomes apparently large but the influence thereof on the image qualities is substantially minimized due to a smaller visibility of blue (B).

Figure 5:
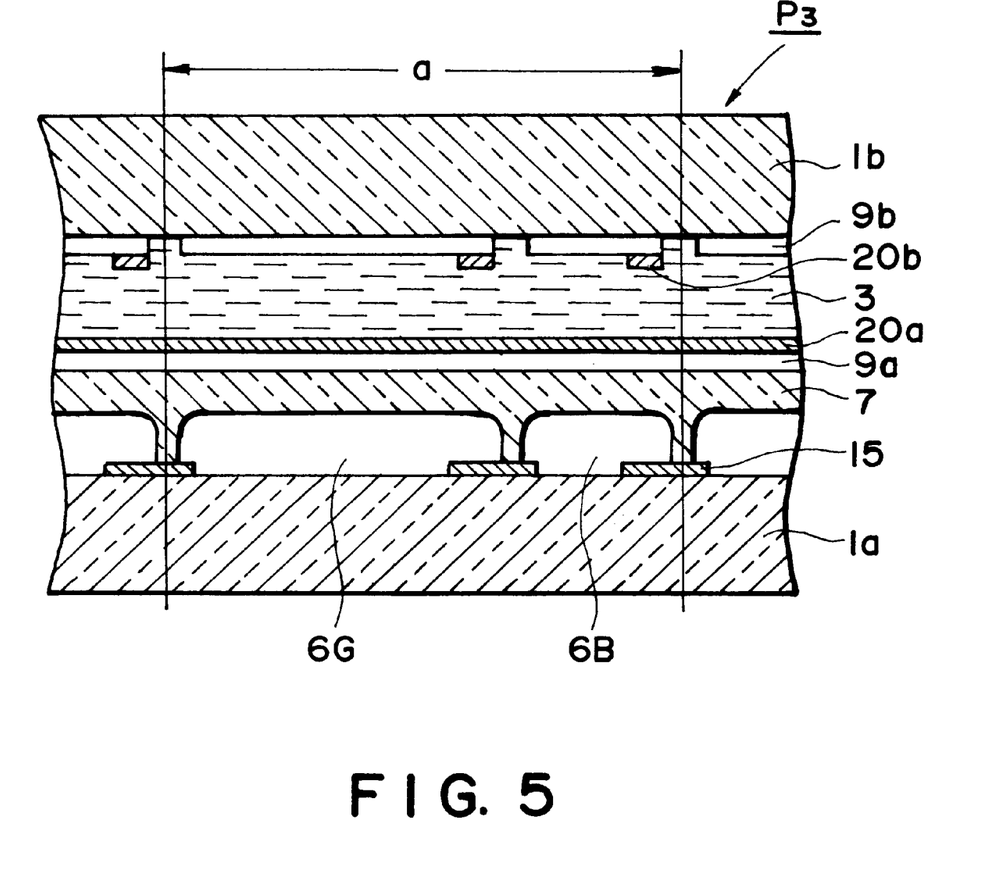
FIG. 5 is a schematic sectional view of another embodiment of a liquid crystal device of the present invention.
Figure 6:
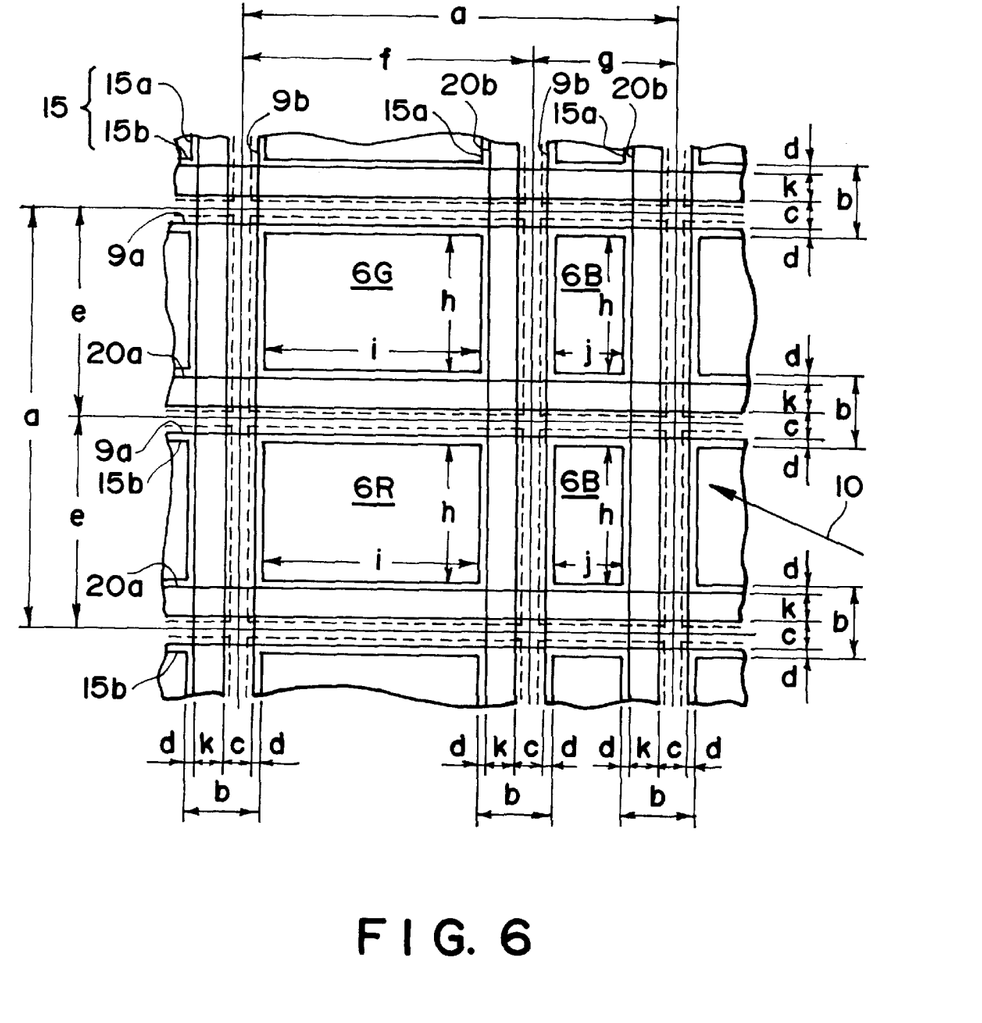
FIG. 6 is a schematic plan view of the liquid crystal device of the present invention shown in FIG. 5 for illustrating shapes and positional relationships for a masking pattern 15, data electrodes 9a, scanning electrodes 9b, auxiliary electrodes 20a and 20b, and color filters 6.

FIGS. 5 and 6 show another embodiment of the liquid crystal device of the present invention and have similar structures to FIGS. 3 and 4, respectively, except that each data electrode 9a and each scanning electrode 9b are provided with an auxiliary electrode 20a and an auxiliary electrode 20b, respectively, and correspondingly a masking pattern 15 is disposed so as to cover such auxiliary electrodes 20a and 20b.

According to this embodiment, the broadened masking pattern 15 covers almost all the switching failure region mentioned above, thus further suppressing the adverse influence of switching failure. The use of the auxiliary electrodes 20a and 20b is effective in providing a lower electric resistance, thus suppressing a propagation delay of a driving wave form.

In the present invention, as other embodiments, in FIGS. 4 and 6, the electrodes 9a may be used as scanning electrodes and the electrodes 9b may be used as data electrodes.

In these cases, the rubbing direction 10 may preferably satisfy a positional relationship with the electrodes 9a (and 9b) similarly as in those in FIGS. 4 and 6.

Hereinbelow, the present invention will be specifically described with reference to Examples.

EXAMPLE 1

A liquid crystal panel (liquid crystal device) P2 as shown in FIGS. 3 and 4 was prepared in the following manner.

The entire surface of one glass substrate 1a was coated with a 1000 Å-thick Mo—Ta alloy film by sputtering (power: 2.2 kV; pressure: 5 mTorr). The Mo—Ta alloy film was coated with a resist and pre-baked, followed by exposure to light, developing and etching to form a 1000 Å-thick masking pattern 15 (of the Mo—Ta alloy film) having a cross-striped shape as shown in FIG. 4. Thereafter, the residual resist was removed.

On the entire glass substrate 1a (provided with the masking pattern 15), a layer of a resin containing a red pigment dispersed therein was applied, followed by patterning and post-baking through a photolithographic process to form a 1.5 μm thick red filter 6R at one of broader two bit openings as shown in FIG. 4. The photolithographic process included steps of resist application, pre-baking, exposure to light, developing and post-baking.

In a similar manner with corresponding color pigments, a 1.5 μm-thick green filter 6G and 1.5 μm thick blue filters 6B were formed at the other broader bit opening and narrower two bit openings (shown in FIG. 4), respectively.

At spacings between the red, green and blue filters 6R, 6G, 6B and 6B, the masking pattern 15 was disposed.

On these color filters 6R, 6G, 6B and 6B and the masking pattern 15, a layer of a transparent region ("PSBK-31", mfd. by Toray K. K.) was applied by spin coating (1000 rpm, 15 sec), followed by post-baking to form a 2.0 μm-thick (as a maximum thickness on the masking pattern 15) flattening layer 7.

The flattening layer 7 was coated with a transparent conductor film of ITO (indium tin oxide) by sputtering, followed by patterning through a photolithographic (etching) process to form 3000 Å-thick stripe-shaped data electrodes 9a.

The data electrodes 9a were coated with a 900 Å-thick insulating film of Ta$_2$O$_5$ (not shown in FIGS. 3 and 4) by sputtering and further coated with a 500 Å-thick alignment control film of polyimide (not shown in FIGS. 3 and 4) by a printing method.

The other substrate 1b was successively coated with 3000 Å-thick stripe-shaped scanning electrodes 9b of ITO, a 900 Å-thick insulating film of Ta$_2$O$_5$ and a 500 Å-thick alignment control film of polyimide similarly as in the case of the substrate 1a described above.

The thus-treated substrates 1a and 1b were applied to each other via dispersed silica beads (1.2 μm dia.) and a sealing agent disposed at the periphery of the substrates 1a and 1b so that the data electrodes 9a and the scanning electrodes 9b intersected each other at right angles while leaving a prescribed cell gap.

Thereafter, the cell gap between the substrates 1a and 1b was filled with a liquid crystal 3 showing smectic C phase, thus preparing a liquid crystal panel P2 as shown in FIG. 3.

In this example, shapes and positional relationships with respect to the masking pattern 15, the scanning electrodes 9b, the data electrodes 9a and the color filters 6 (the red, green and blue filters 6R, 6G, 6B and 6B) were as shown in FIG. 4.

Referring to FIG. 4, the masking pattern 15 was comprised of stripe lines 15a (extending along spacings between the scanning electrodes 9) having a width (b) of 18 μm and stripe lines 15b (extending along spacings between the data electrodes 9a) having a width (b) of 18 μm. A pitch (e) (a distance between center lines of adjacent stripe lines 15b) of all the stripe lines 15b was set to 45 μm. On the other hand, a larger pitch (f) of broader stripe lines 15a (extending along spacings between the scanning electrodes 9b) was set to 54 μm and a smaller pitch (g) of narrower stripe lines 15a was set to 36 μm, thus defining four (first to fourth) bit openings including broader first and second bit openings each having an area of (h)×(i) (=27×36 μm) and narrower third and fourth bit openings each having an area of (h)×(j) (=27×18 μm) with an areal ratio of the first (or second) bit opening: the third (or fourth) bit opening=2:1.

The (broader) first and second bit openings were provided with the green filter 6G and the red filter 6R, respectively. The (narrower) third and fourth bit openings were each provided with the blue filters 6B. As a result, the first to fourth bit openings (6G, 6R, 6B and 6B) provided on areal ratio of 2:2:1:1, thus forming three color (R, G and B) regions equal in area as a whole for each pixel including the first to fourth bit openings.

All the data electrodes 9a each having a width of 37 μm were arranged along the stripe liens 15b of the masking pattern 15 so as to cover the bit openings. The broader scanning electrodes 9b each having a width of 46 μm and the narrower scanning electrodes 9b each having a width of 28 μm were arranged alternately along the stripe lines 15a so as to cover the bit openings. As a result, the above-described four (first to fourth) bit openings were provided at four intersections formed by adjacent two scanning electrodes 9b and adjacent two data electrodes 9a intersecting each other at right angles.

As a result of the above arrangement of the scanning electrodes 9b and the data electrodes 9a, each electrode 9a (or 9b) overlapped with its adjacent (two) stripe lines 15b (or 15a) while leaving opposite overlapping side portions each having a width (d) of 5 μm and was apart from the adjacent electrode 9a (or 9b) with a spacing (c) of 8 μm.

Each pixel thus constituted had a size of (a)×(a) (=90×90 μm), thus provided a resolution of (25400 μm/90 μm)=ca. 282 dpi.

When the above-prepared liquid crystal panel P2 was actually driven it was possible to display high definition-multi color images with high qualities.

The liquid crystal panel P2 also provided effects similarly as in the above-described embodiment with reference to FIGS. 3 and 4. Specifically, the liquid crystal panel P2 was effective in minimizing the adverse influence of switching failure, the lowering of resolution and the disturbance of color balance, etc.

As a modification embodiment of this example, the arrangement of the red, green and blue filters (6R, 6G, 6B and 6B) was modified so that the first to fourth bit openings (6G, 6R, 6B and 6B) in this example were changed to those (6B, 6R, 6G and 6G), respectively.

As a result, the similar effects as described above were attained.

EXAMPLE 2

A liquid crystal panel P3 as shown in FIGS. 5 and 6 was prepared in the same manner as in Example 1 except that stripe-shaped scanning electrodes 9b and stripe-shaped data electrodes 9a were prepared in the same manner as in Example 1 and were coated in a manner shown below with 1000 Å-thick auxiliary electrodes 20b and 20a each having a width (k) of 6 μm, respectively, along each one side portion of the respective electrodes 9b and 9a as shown in FIGS. 5 and 6.

On the scanning electrodes 9b and the data electrodes 9a and the auxiliary electrodes 20b and 20a were respectively formed in the same manner as in the scanning and data electrodes 9b and 9a used in Example 1 except for using a 1000 Å-thick film of aluminum alloy (Al:Si:Cu=98.5:1.0:0.5) and employing sputtering conditions including a power of 2.6 kW and a temperature of 150 °C.

The resultant masking pattern 15 was comprised of stripe lines 15a and 15b each having a width (b) of 24 μm and the pitches (f) and (g) of the broader and narrower stripe lines 15a were set to 52 μm (f) and 38 μm(g), respectively, thus providing four (first to fourth) bit openings (6R, 6G, 6B and 6B) having a size of (h)×(i) (=21×28 μm) for 6R and 6G and a size of (h)×(j) (=21×14 μm) for 6B and 6B while satisfying an areal ratio of 6R:6G:6B:6B=2:2:1:1 similarly as in Example 1.

According to this example, in addition to the effects obtained in Example 1, the following effects were also achieved.

Specifically, in this example, the use of the broader masking pattern 15 was effective in further minimizing the adverse influence of switching region on the resultant image qualities when compared with the case of Example 1. Further, the electric resistance of the entire electrodes (including the auxiliary electrodes 20a and 20b) was reduced to 1/5 of that of the electrodes with no auxiliary electrodes 20a and 20b as in the case of Example 1. thus also being effective in suppressing a propagation delay of a drive waveform.

As described hereinabove, according to the present invention, a set of four intersections formed by adjacent two data electrodes and adjacent two scanning electrodes (disposed perpendicular to the data electrodes) constitutes one pixel, so that a minimum width of each bit opening at each intersection is made larger than that (e.g., 12 μm) of each bit opening in the case of the conventional liquid crystal panel described above even when a resolution is increased up to at least 250 dpi, thus lowering an adverse influence of switching failure of a liquid crystal on resultant display (image) qualities.

Further, due to each pixel constituted by four intersections adjacent to each other, the (four) color filter of three colors (the red filter, the green filter, the blue filter and the blue filter) at the corresponding four bit openings are also adjacent to each other, thus resulting in a display state with substantially no apparent lowering in resolution even when any color filter is turned "ON".

In addition, the four bit openings provided with the green filter, the red filter, the blue filter and the blue filter are arranged to have the areal ratio of 2:2:1:1 (G:R:B:B) as described above, thus resulting in an identical area with respect to the respective color filters of three colors thereby to obviate a disturbance of color balance.

Further, in the present invention, even if the switching failure occurs at the narrower two bit openings (provided with the two blue filter), the influence thereof on the image qualities can be substantially minimized due to a smaller visibility of blue.

What is claimed is:

1. A liquid crystal device, comprising:

a first substrate provided with a plurality of scanning electrodes, a second substrate provided with a plurality of data electrodes and disposed opposite to the first substrate, the data electrodes intersecting the scanning electrodes to form a plurality of pixels, a liquid crystal disposed between the first and second substrates, and a plurality of color filters of first to third colors composed of red, green and blue disposed on one of the first and second substrates, wherein each pixel is constituted by four intersections formed by adjacent two scanning electrodes and adjacent two data electrodes, said four intersections being provided with said color filters of first to third colors, and wherein said four intersections includes first and second intersections provided with color filters of the first and second colors, respectively, and third and fourth intersections each provided with a color filter of the third color.

2. A device according to claim 1, wherein said first to fourth intersections are arranged to provide corresponding first to fourth openings, respectively, having an areal ratio of 2:2:1:1 in this order.

3. A device according to claim 2, wherein the first color is green, the second color is red and the third color is blue.

4. A device according to claim 1, wherein said plurality of color filters were disposed on the second substrate provided with the data electrodes.

* * * * *

UNITED STATES PATENT AND TRADEMARK OFFICE
CERTIFICATE OF CORRECTION

PATENT NO.   : 6,081,309
DATED        : June 27, 2000
INVENTOR(S)  : MASAAKI SUZUKI ET AL.

It is certified that error appears in the above-identified patent and that said Letters Patent is hereby corrected as shown below:

Col. 1, line 41, "5aand" should read --5a and--;

Col. 2, line 17, "line 5a" should read --lines 5a--;

Col. 4, line 56, "filter 6B" should read --filters 6B;

Col. 8, line 40, "includes" should read --include--.

Signed and Sealed this

Twenty-fourth Day of April, 2001

Attest:

NICHOLAS P. GODICI

*Attesting Officer*   Acting Director of the United States Patent and Trademark Office